United States Patent
Kim et al.

(10) Patent No.: US 8,456,511 B2
(45) Date of Patent: Jun. 4, 2013

(54) METHOD AND APPARATUS FOR REPRODUCING IMAGE USING OUTPUT PREDICTION

(75) Inventors: Yun-tae Kim, Yongin-si (KR); Heui-keun Choh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1623 days.

(21) Appl. No.: 11/712,927

(22) Filed: Mar. 2, 2007

(65) Prior Publication Data

US 2007/0206853 A1   Sep. 6, 2007

(30) Foreign Application Priority Data

Mar. 2, 2006   (KR) .................. 10-2006-0020014

(51) Int. Cl.
*G06K 9/40*   (2006.01)
(52) U.S. Cl.
USPC ............................................................ 348/34
(58) Field of Classification Search
USPC ............................................................ 348/34
See application file for complete search history.

(56) References Cited

U.S. PATENT DOCUMENTS

| | | | | |
|---|---|---|---|---|
| 6,108,009 A | * | 8/2000 | Nishikawa | 345/590 |
| 6,449,052 B1 | * | 9/2002 | Sherer et al. | 358/1.13 |
| 6,600,574 B2 | * | 7/2003 | Miyano | 358/1.9 |
| 6,873,743 B2 | * | 3/2005 | Steinberg | 382/275 |
| 7,525,685 B2 | * | 4/2009 | Maniam et al. | 358/1.9 |
| 7,587,085 B2 | * | 9/2009 | Steinberg et al. | 382/167 |
| 7,619,773 B2 | * | 11/2009 | Haikin et al. | 358/1.9 |
| 7,764,400 B2 | * | 7/2010 | Harrington | 358/1.9 |
| 7,859,719 B2 | * | 12/2010 | Tomomatsu | 358/1.9 |

FOREIGN PATENT DOCUMENTS

| | | |
|---|---|---|
| JP | 7-307871 A | 11/1995 |
| JP | 8-32828 A | 2/1996 |
| KR | 2001-0010195 A | 2/2001 |
| KR | 2002-0027782 A | 4/2002 |

\* cited by examiner

Primary Examiner — David Eng
(74) Attorney, Agent, or Firm — Sughrue Mion, PLLC

(57) ABSTRACT

A method and apparatus for image reproduction using output prediction is provided. The method includes converting color information of a first color space input to an image display device into color information of a second color space in which a sampled viewing environment of an output object by a printing device has been reflected; selecting a specific color distortion region according to a difference between an actual viewing environment and the sampled viewing environment of the converted second color space, and compensating a color component of the selected specific color distortion region; and converting corrected color information of the second color space which has been created through the compensation into corrected color information of the first color space, and outputting the corrected color information of the first color space through the image display device.

15 Claims, 12 Drawing Sheets

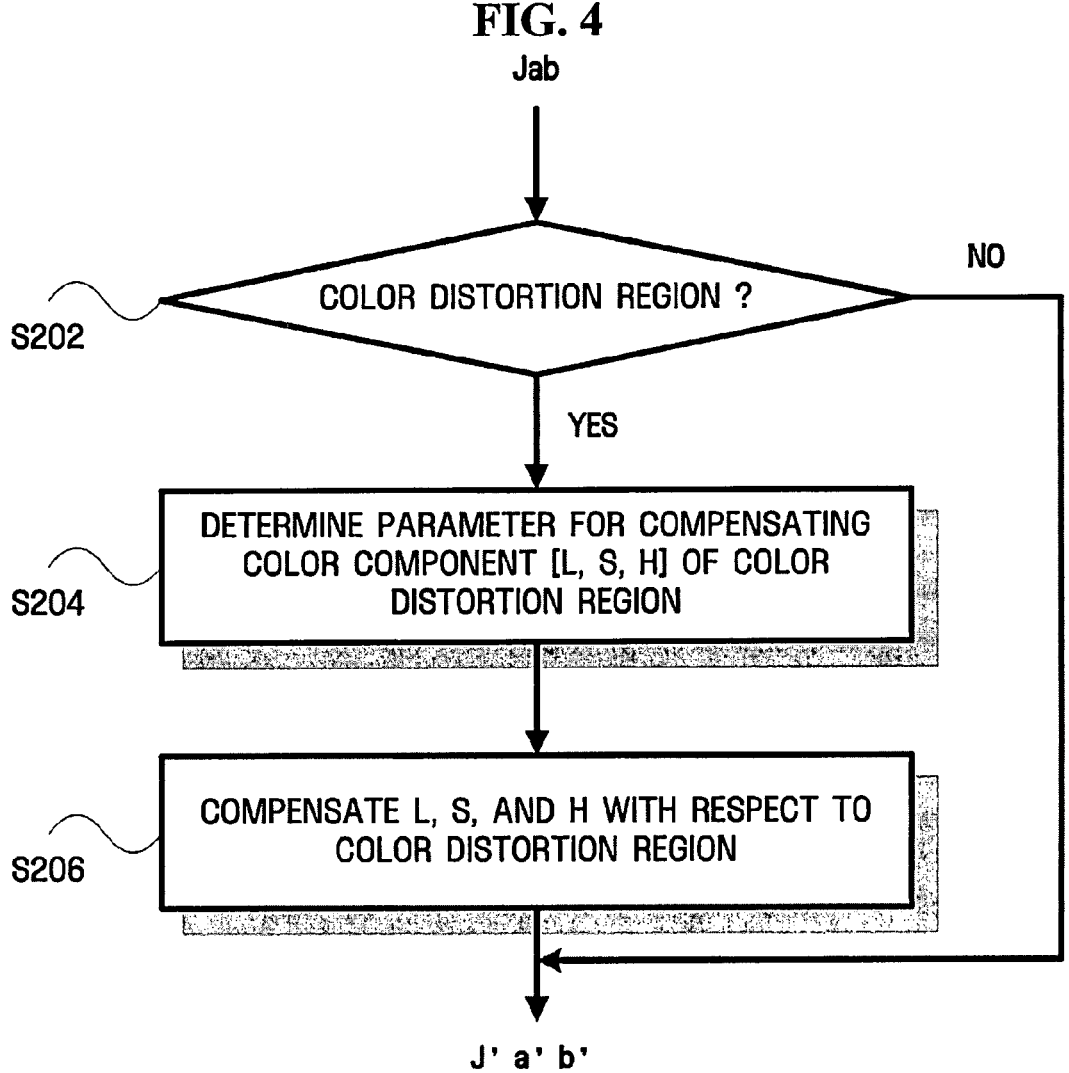

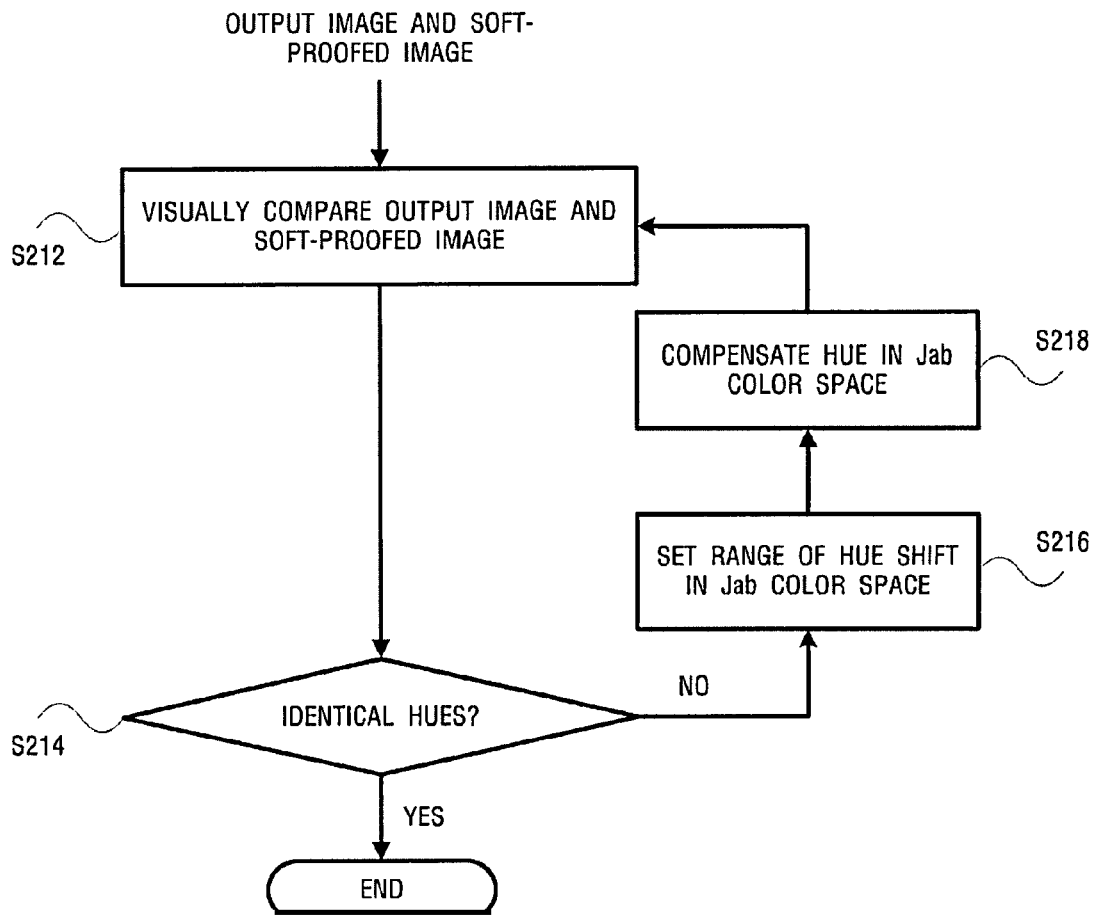

FIG. 6B
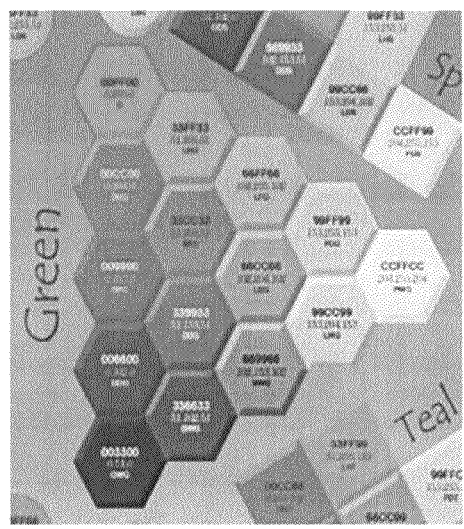
IMAGE IN WHICH SATURATION
IS DISTORTED
IMAGE IN WHICH SATURATION
IS COMPENSATED

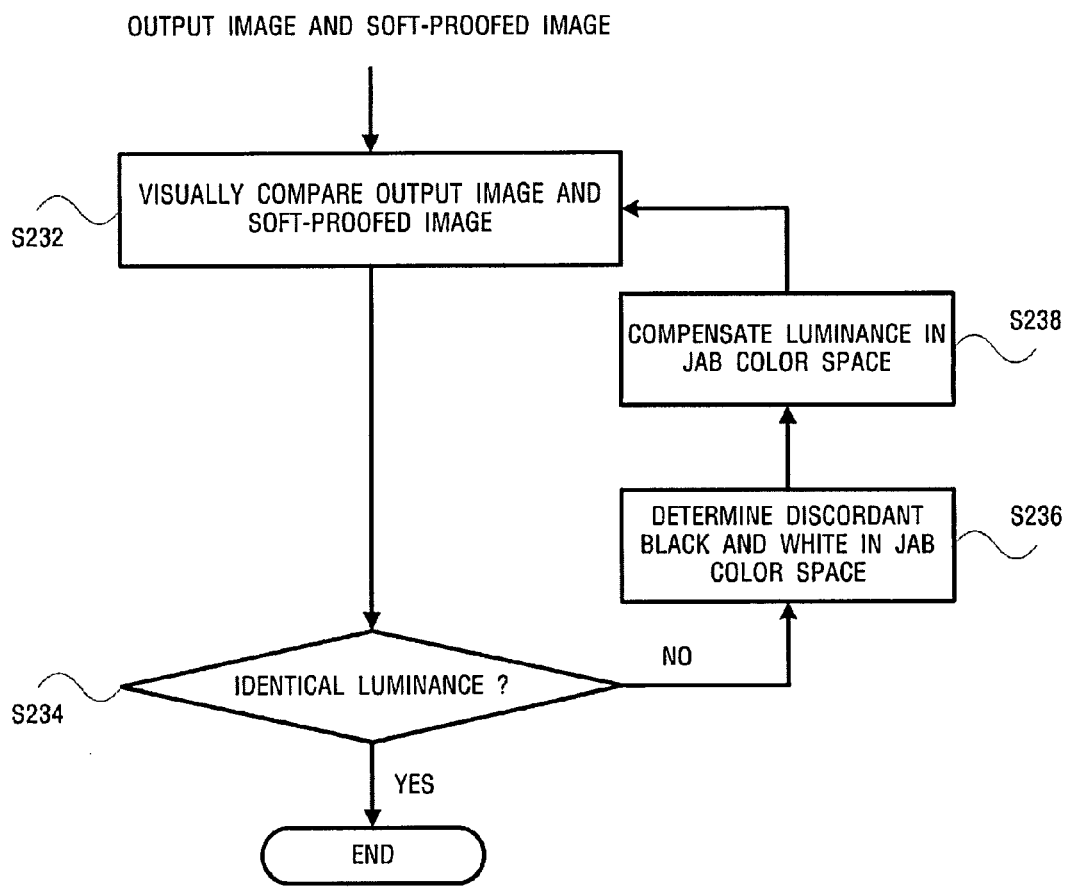

IMAGE IN WHICH LUMINANCE IS DISTORTED

IMAGE IN WHICH LUMINANCE IS COMPENSATED

METHOD AND APPARATUS FOR REPRODUCING IMAGE USING OUTPUT PREDICTION

CROSS-REFERENCE TO RELATED APPLICATION

This application claims priority from Korean Patent Application No. 10-2006-0020014 filed on Mar. 2, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to image reproduction, and more particularly to reproducing an image using output prediction so as to reproduce an output of a printing device in advance in an image display device before the output is actually made by the printing device.

2. Description of the Prior Art

Digital image devices for reproducing colors, such as monitors, scanners, and printers have been provided with various functions and high quality in order to satisfy various demands from users, and they use different color spaces or color models according to respective application fields.

The color models are used to specify classified colors by classifying the colors according to their attributes, such as hue, saturation (or chroma), luminance, and brightness. The color models are divided into a device-dependent model and a device-independent model. The former includes an RGB (Red, Green, and Blue) model which is a kind of additive color space model, and a CMYK color model which is a kind of subtractive color space model. The latter includes a CIE L*a*b* model, a CIE XYZ model, a CIE LUV model, and so forth. The CIE color models have been determined by the International Commission on Illumination (ICI) that sets the standards for illumination devices. The CIE_XYZ color model uses a chromaticity diagram, and is obtained by translating all RGB tristimulus values into XYZ values, which are a different set of tristimulus values having a positive sign.

Meanwhile, image display devices such as monitors use the RGB model, which is a kind of additive color space model, and printing devices such as printers use the CMYK color model, which is a kind of subtractive color space model. Since the image display device and the printing device use different color mixing principles, as described above, they have different color gamuts. Therefore, the two devices output different colors even for the same image signal. Therefore, various soft-proofing technologies capable of preliminarily predicting the output image of a printing device through an image display device have been disclosed, and these technologies may be classified into two types of soft-proofing technologies.

First, a soft-proofing technology (first-type soft-proofing technology) using a fixed viewing environment has been disclosed. The first-type soft-proofing technology refers to a method of creating RGB data of an image display device so as to correspond to CMYK data of a printing device under a constant viewing environment. Since the first-type soft-proofing technology has been made without taking various viewing environments into consideration, it has a problem in that the color of a soft-proofed image in the image display device is not exactly matched with the output image of the printing device when conditions change.

Secondly, a technology (second-type soft-proofing technology) of performing a soft proofing through sampling of various viewing environments has been disclosed. The second-type soft-proofing technology refers to a method of performing a soft proofing with reference to a viewing environment, which provides the best color matching based on an actual viewing environment, among a plurality of viewing environments having preset conditions. Therefore, in order to use the second-type soft-proofing technology, it is necessary to preliminarily set up many viewing environments for exact matching with various actual viewing environments, which rapidly increases the number of viewing environment conditions.

SUMMARY OF THE INVENTION

Accordingly, the present invention has been made to solve the above-mentioned problems occurring in the prior art, and an aspect of the present invention is to provide a method and an apparatus for image reproduction through output prediction, by which it is possible to predict an output of a printing device in advance using an image display device before the printing device produces the output.

The aspects of the present invention may not be limited to the above aspects and those skilled in the art will appreciate other aspects of the present invention from the following description.

In order to accomplish these aspects, there is provided a method of reproducing an image using output prediction, the method including converting color information of a first color space input to an image display device into color information of a second color space in which a sampled viewing environment of an output object by a printing device has been reflected; selecting a specific color distortion region according to a difference between an actual viewing environment and the sampled viewing environment of the converted second color space, and compensating a color component of the selected specific color distortion region; and converting corrected color information of the second color space which has been created through the compensation into corrected color information of the first color space, and outputting the corrected color information of the first color space through the image display device.

In another aspect of the present invention, there is provided an apparatus for reproducing an image using output prediction, the apparatus including a conversion unit that converts color information of a first color space input to an image display device into color information of a second color space in which a sampled viewing environment of an output object by a printing device has been reflected; a selection unit that selects a specific color distortion region according to a difference between an actual viewing environment and the sampled viewing environment of the converted second color space; a compensation unit that compensates a color component of the selected specific color distortion region; and an inverse conversion unit that converts corrected color information of the second color space which has been created by the compensation unit into corrected color information of the first color space.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the present invention will be apparent from the following detailed description taken in conjunction with the accompanying drawings, in which:

FIG. 4 is a flowchart illustrating a procedure for compensating for a color distortion region shown in FIG. 3 according to each color component;

FIGS. 5A and 5B are views illustrating a hue compensation procedure for the specific color distortion region;

FIGS. 6A and 6B are views illustrating a saturation compensation procedure for the specific color distortion region;

FIGS. 7A and 7B are views illustrating a luminance compensation procedure for the specific color distortion region;

DETAILED DESCRIPTION OF THE EXEMPLARY EMBODIMENTS

Figure 1:
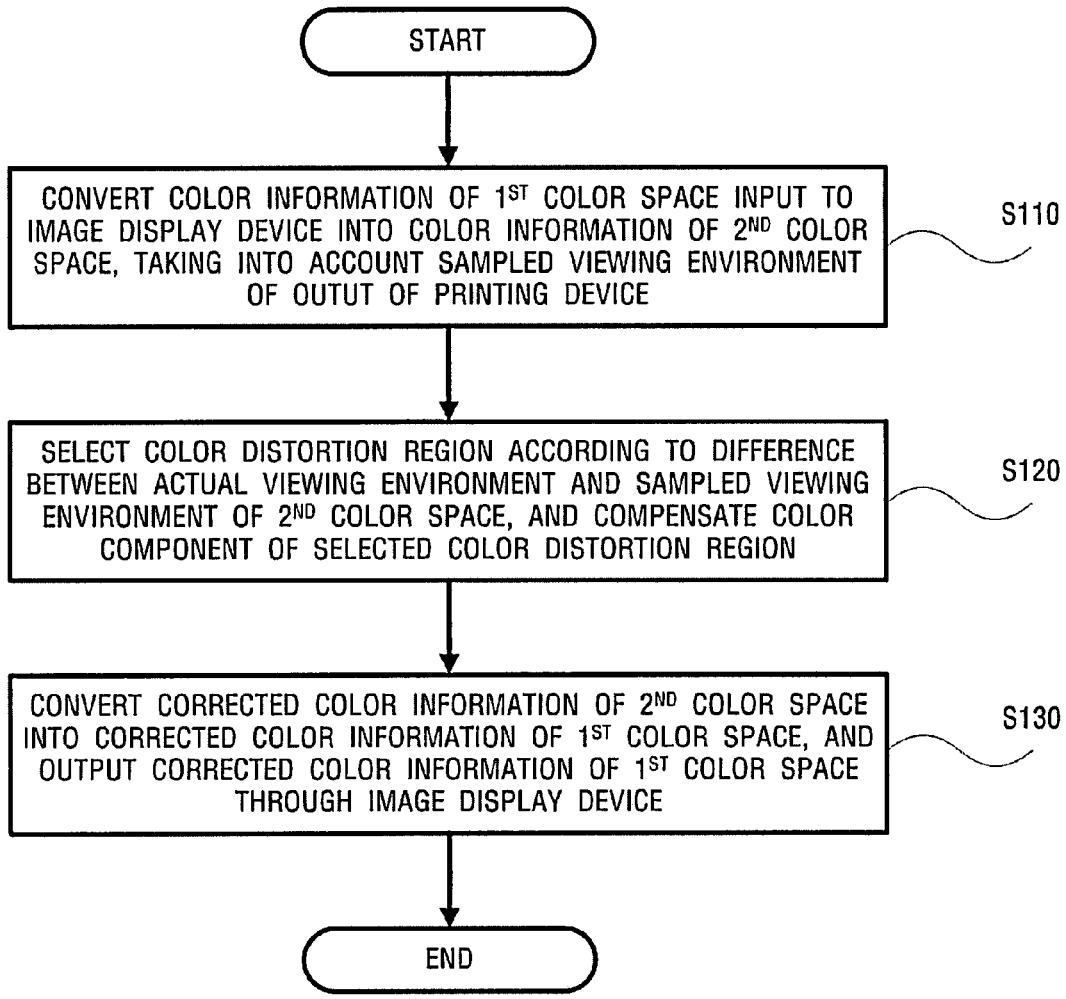
FIG. 1 is a flowchart illustrating an overall flow of an image reproduction method using output prediction according to an exemplary embodiment of the present invention.

Other detailed aspects of the present invention are included in the following detailed description and the accompanying drawings. Advantages and features of the present invention, and methods for achieving them will be apparent to those skilled in the art from the detailed description of the exemplary embodiments together with the accompanying drawings. The scope of the present invention is not limited to the exemplary embodiments disclosed in the specification and the present invention can be realized in various manners. The described present exemplary embodiments are presented only for completely disclosing the present invention and helping those skilled in the art to completely understand the scope of the present invention, and the present invention is defined only by the scope of the claims. In the following description of the present invention, the same drawing reference numerals are used for the same elements across different drawings.

Hereinafter, exemplary embodiments of the present invention will be described in detail with reference to block diagrams and flowcharts predefined for explaining an apparatus and method for reproducing an image using output prediction.

FIG. 1 is a flowchart illustrating an overall flow of an image reproduction method using output prediction according to an exemplary embodiment of the present invention. The image reproduction method using output prediction according to an exemplary embodiment of the present invention will now be briefly described with reference to FIG. 1.

First, color information of a first color space, which has been input to an image display device such as a monitor, is converted into color information of a second color space which is used for the output of a printing device such as a printer (S110). In this case, the color conversion into the color information of the second color space is achieved by using an existing soft-proofing scheme. Specifically, the color conversion is performed either by a soft-proofing in accordance with a fixed viewing environment or by a soft-proofing in accordance with the sampling of various viewing environments. The following description will be given with respect to the case of using a color conversion by a soft-proofing scheme in accordance with the sampling of various viewing environments. Since the image based on the color information of the second color space is a soft-proofed image reflecting the viewing environments sampled in advance, which include the chromaticity and brightness of an illuminator, in view of a corresponding output image, it is possible to preliminarily predict the image of an output of a printing device in advance by an image display device. However, there may be a distortion region in which the soft-proofed image reflecting the sampled viewing environment of the image display device and the output image of the printing device under an actual viewing environment differ from each other. When such a distortion region exists, it is necessary to compensate for the distortion region.

For such compensation, a specific color distortion region, which is determined as a distortion part, is selected in the converted second color space by a visual matching method of an observer, and each color component in the selected specific color distortion region is compensated (S120).

Finally, the corrected color information of the second color space, which has been obtained through the compensation, is converted into corrected color information of the first color space, taking account the viewing environment of the image by the image display device (S130), so that it is possible through the image display device to exactly predict the output image of the printing device. Herein, the viewing environments represent viewing environments based on the brightness of an illuminator, and may include viewing environments under the sunlight, under a glow lamp, and under a fluorescent lamp. For example, an image under a glow lamp has a red hue in general, and an image under daylight has a relatively blue hue as compared with the image under the glow lamp. In general, a high color temperature results in a bluish tone, and a low color temperature results in a reddish tone.

Figure 2:
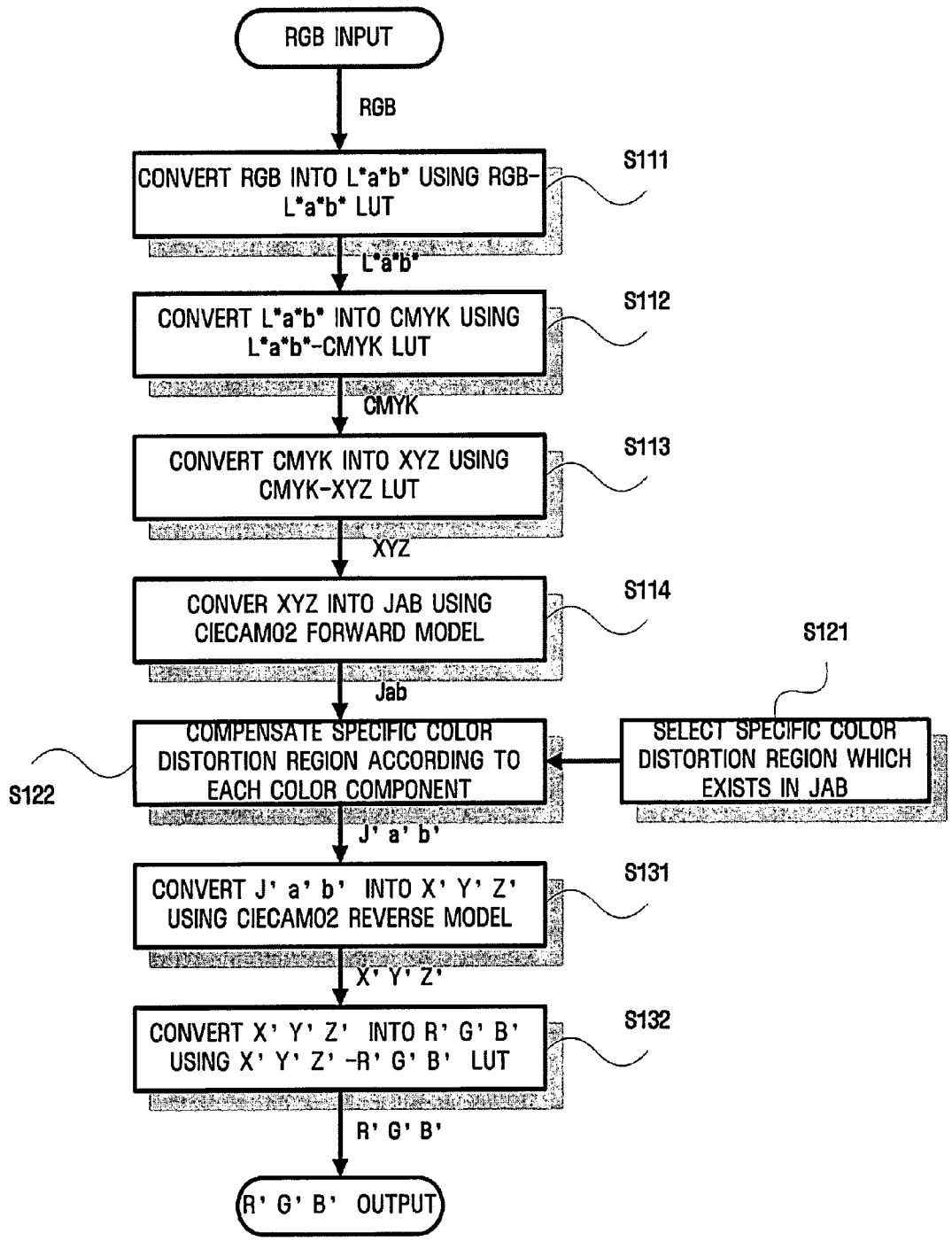
FIG. 2 is a detailed flowchart of the overall process shown in FIG. 1.

FIG. 2 is a detailed flowchart of the overall process shown in FIG. 1. The image reproduction method using output prediction will now be described in more detail with reference to FIG. 2.

In the following description of FIG. 2, it is assumed that the color information of the first color space is the color information of an RGB color space, the color information of the second color space is the color information of a Jab color space, the corrected color information of the first color space is the color information of an R'G'B' color space, and the corrected color information of the second color space is the color information of a J'a'b' color space. In addition, it is apparent to those skilled in the art that the scope of the present invention is not limited to the color information of the illustrated color spaces.

Referring to FIG. 2, when an RGB image has been input into the image display device, the input RGB image is converted into an image of an L*a*b* color space by using an RGB-L*a*b* look-up table (LUT) (S111). Then, the L*a*b* image is converted into an image of a CMYK color space, which is a device-dependent subtractive color model, by using an L*a*b*-CMYK LUT (SI 12). The image of the CMYK color space is converted into an image of a device-independent CIE_XYZ color space by using a CMYK-XYZ LUT (S113). The image of the CIE_XYZ color space is converted into an image of the Jab color space which is a device-independent color model, which may be achieved by using a CIECAM02 forward model (S114). In the image conversion into the image of the Jab color space, an image conversion taking into account a predetermined viewing environment sampled for an output image, is achieved.

Since a viewing environment sampled for an output image of the printing device has been taken into account in the image of the Jab color space, the output image of the printing device can be displayed in advance in the image display device by soft proofing. However, since the soft-proofed image has been obtained through sampling of the viewing environments, an actual viewing environment has not been taken into account in the soft-proofed image. Therefore, a distortion region due to color discord exists between the image generated by the soft proofing and the actual output image. For example, the soft-proofed image obtained in consideration of a viewing environment may include a color distortion in a specific color region thereof due to an error of the CIECAM02 forward model or an error by the property of a toner, so that it is difficult to exactly display the output image of the printing device through the image display device when the image has been soft-proofed by taking into account only a sampled viewing environment.

Therefore, when a distortion region exists between an image that has been soft-proofed based on a sampled viewing environment and an actual output image, a color component compensation procedure is required in order to reduce the error in the distortion region.

To this end, when the distortion region exists, a specific color distortion region is selected within the Jab color space (S121), and a compensation procedure is performed according to each color component with respect to the selected specific color distortion region (S122). Operations S121 and S122 will now be described in more detail with reference to FIGS. 3 to 7B.

Figure 3:
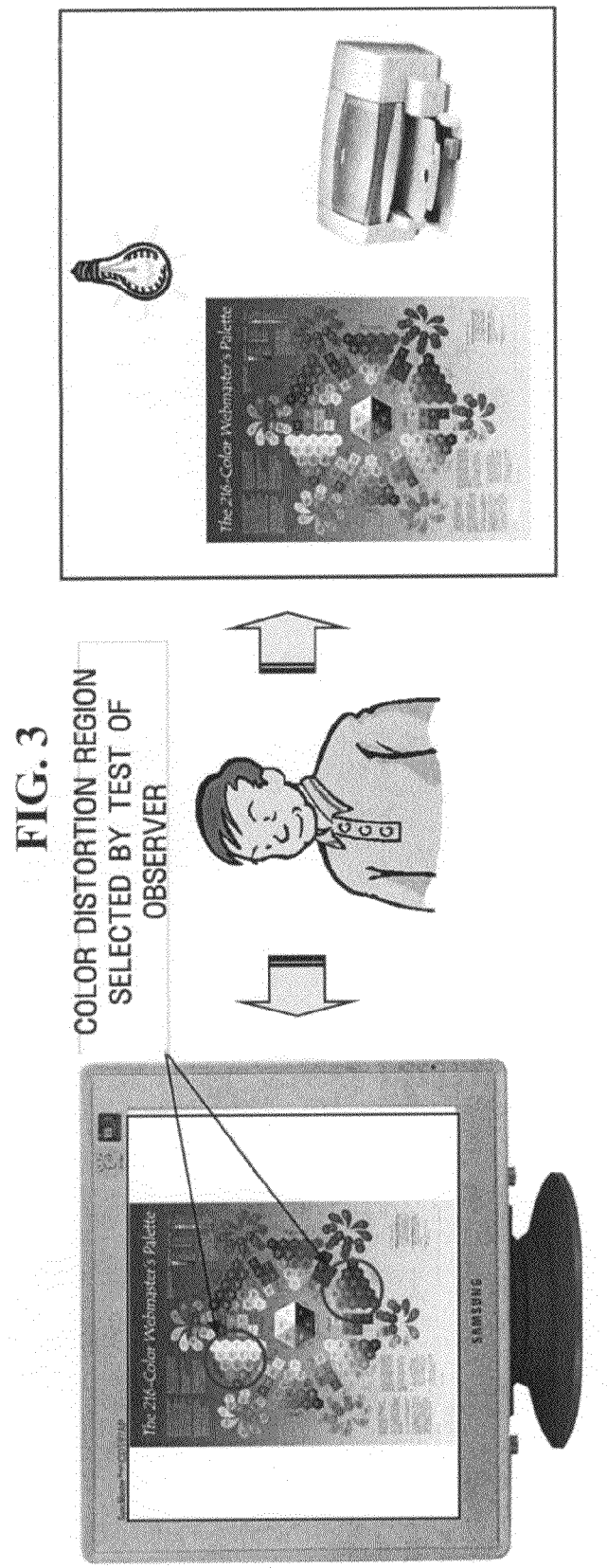
FIG. 3 is a view showing a conception of a procedure for selecting a specific color distortion region according to an exemplary embodiment of the present invention.

FIG. 3 is a view showing a conception of a procedure for selecting a specific color distortion region according to an exemplary embodiment of the present invention. As shown in FIG. 3, the color distortion region is selected through a visual matching test process, in which the observer visually compares the output image of the printing device with a soft-proofed image predicted through the image display device by considering a sampled viewing environment. In detail, the output image and the soft-proofed image are respectively divided into a plurality of predetermined regions, and the two images are compared with each other with respect to color components for to each predetermined region. Then, the comparison result is estimated as a numerical value for each color component, and a patch group corresponding to a region having the largest sum of numerical values is selected as a color distortion region. Herein, the color components may include a luminance component which represents brightness of color, a chroma (or saturation) component which represents clarity of color, and a hue component.

For example, color patch groups of the output image and soft-proofed image may be divided into R (Red), RM (RedMagenta), M (Magenta), BM (BlueMagenta), B (Blue), BC (BlueCyan), C (Cyan), GC (GreenCyan), G (Green), GY (GreenYellow), Y (Yellow), RY (RedYellow), and others. The distortion degrees of the luminance, saturation, and hue for each color patch group are respectively expressed as a score, a color patch group having the largest sum of three scores of the luminance, saturation, and hue is selected as the color distortion region.

FIG. 4 is a flowchart illustrating a procedure for compensating for a color distortion region shown in FIG. 3 according to each color component. Referring to FIG. 4, first, it is determined if a region in the Jab color space is a color distortion region (S202). When the corresponding region in the Jab color space is a color distortion region, parameters for compensating the luminance, saturation, and hue, which are color components of the color distortion region, are determined (S204). Then, the luminance, saturation, and hue of the color distortion region are compensated by using the parameters (S206), thereby creating a soft-proofed image compensated in the J'a'b' color space. Herein, a hue shift range may be designated as the parameters in the case of hue distortion, a saturation compensation range and a compression ratio of saturation compensation may be designated as the parameters in the case of saturation distortion, and black and white point values may be designated as the parameters in the case of luminance distortion. Such compensating procedures according to each color component will be described in detail with reference to FIGS. 5A, 5B, 6A, 6B, 7A, and 7B.

Figure 5B:
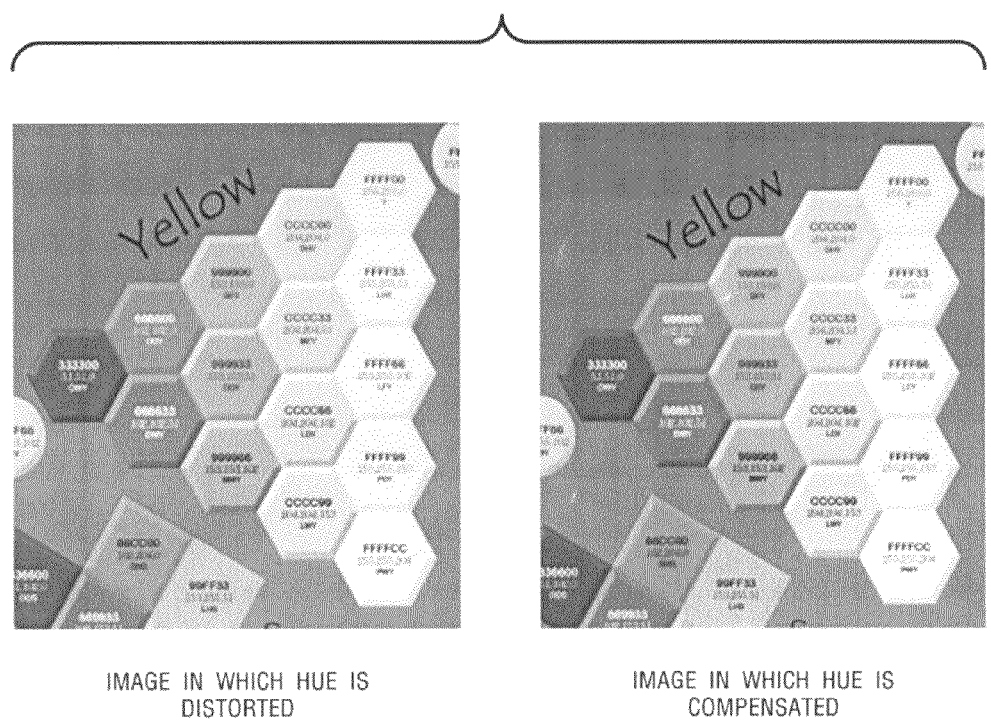
Figure 6A:
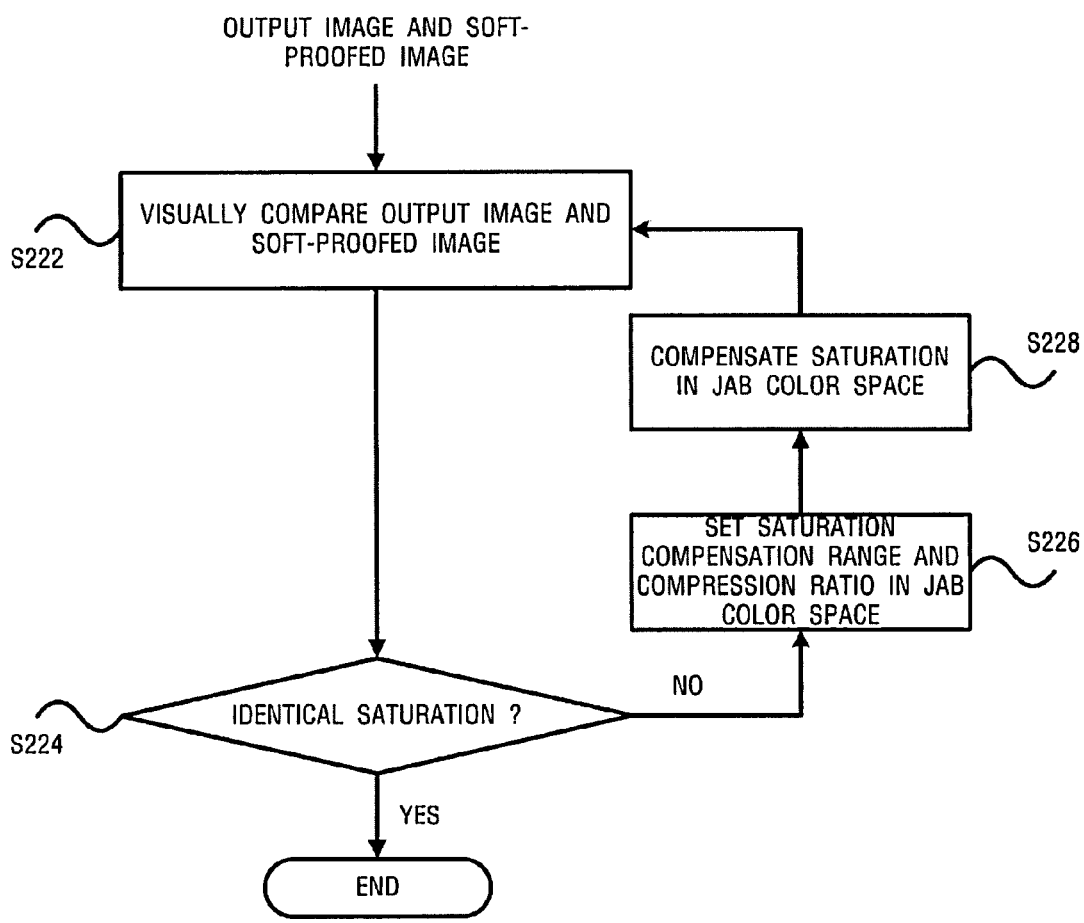
Figure 7B:
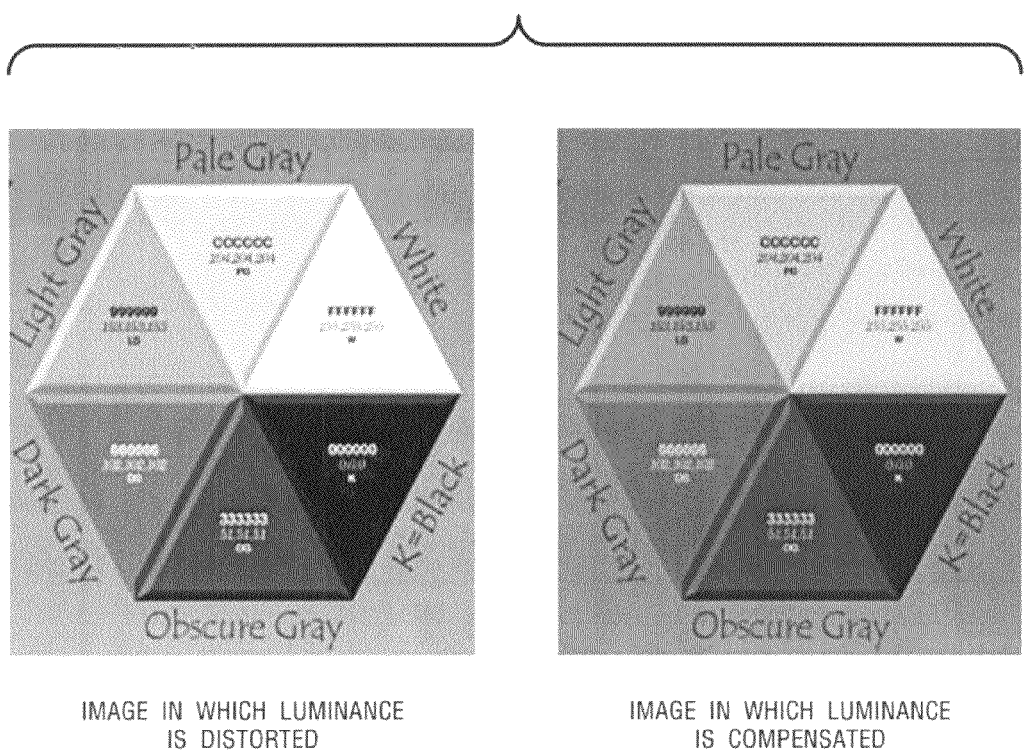

FIGS. 5A and 5B are views illustrating a hue compensation procedure for the specific color distortion region, FIGS. 6A and 6B are views illustrating a saturation compensation procedure for the specific color distortion region, and FIGS. 7A and 7B are views illustrating a luminance compensation procedure for the specific color distortion region.

First, the hue compensation procedure will now be described with reference to FIG. 5A. After the output image of the printing device and the soft-proofed image are visually compared to each other (S212), it is determined if the hues of the two images are identical (S214). When the hues of the two images are not identical, a hue shift range is established in the Jab color space (S216), the hue of the soft-proofed image is compensated within the hue shift range (S218). After the hue compensation, the procedure returns to operation S212. When it is determined in operation S214 that the hues of the two images are identical to each other, the hue compensation is not performed. The above-mentioned hue compensation process is illustrated in FIG. 5B. When a yellow region in the soft-proofed image shown at the left side in FIG. 5B is displayed not as a pure yellow image but as a greenish yellow image mixed with green, the range of the greenish yellow region is selected, a hue range of a pure yellow region at which the compensation aims is established, and then the greenish yellow region is hue-converted into the pure yellow region.

The saturation compensation procedure will now be described with reference to FIG. 6A. After the output image of the printing device and the soft-proofed image are visually compared to each other (S222), it is determined if the saturations of the two images are identical (S224). When the saturations of the two images are not identical, a saturation compensation range and a saturation compression ratio is established in the Jab color space (S226), the distorted saturation is compensated according to the saturation compensation range and compression ratio (S228). After the saturation compensation, the procedure returns to operation S222. When it is determined in operation S224 that the saturations of the two images are identical to each other, the saturation compensation is not performed. The above-mentioned saturation compensation process is illustrated in FIG. 6B. When the saturation of a green region in the soft-proofed image shown at the left side in FIG. 6B is excessively reproduced as compared with that in the actual output image of the printing device, the saturation is compensated by establishing the range of the green region and determining a compression ratio for saturation.

The luminance compensation procedure will now be described with reference to FIG. 7A. After the output image of the printing device and the soft-proofed image are visually compared to each other (S232), it is determined if the luminancees of the two images are identical (S234). When the luminancees of the two images are not identical, black and white points which are objects of luminance compensation are determined in the Jab color space (S236), the determined black and white points are compensated to match the black and white points of the output image of the printing device (S238). After the luminance compensation, the procedure returns to operation S232. When it is determined in operation S234 that the luminance of the two images are identical to each other, the luminance compensation is not performed. The above-mentioned luminance compensation process is illustrated in FIG. 7B. When the luminance values of the black and white points in the soft-proofed image shown at the left side in FIG. 7B are not identical to those of the black and white points in the output image by the actual printing device, the black and white points displayed through the image display device are compensated to match the black and white points of the actual output image.

Meanwhile, since the image obtained by removing a distorted color region through compensation for each color component, as described above, corresponds to an image in the J'a'b' color space, it is necessary to convert the image of the J'a'b' color space into an image of a device-dependent color space. Referring again to FIG. 2, the compensated image of the J'a'b' color space is converted into an image of a CIE_X'Y'Z' color space, which is corrected color information of the CIE_XYZ color space, by using a CIECAM02 reverse model (S131). Then, finally, the image of the CIE_X'Y'Z' color space is converted into an image of the R'G'B' color space by using an X'Y'Z'-R'G'B' LUT, so that it is possible to exactly predict the actual output image by displaying a soft-proofed image which reflects the viewing environment for the output image of the printing device.

Figure 8:
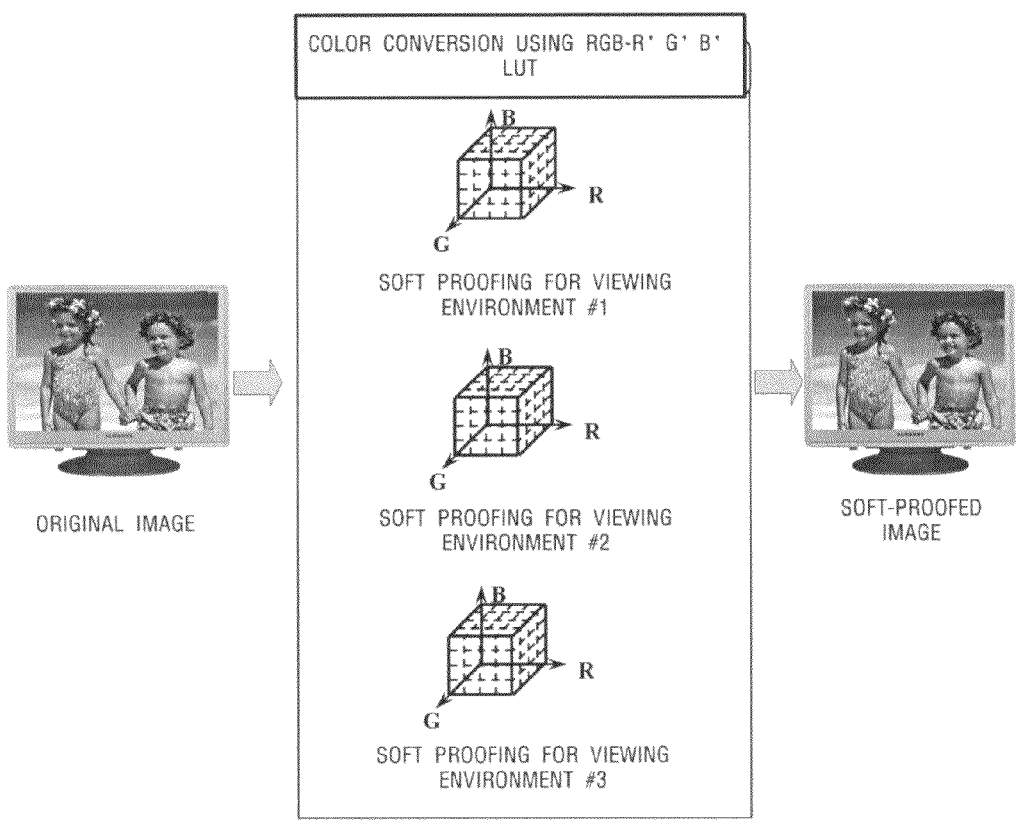
FIG. 8 is a view schematically illustrating a conception of color conversion using LUTs in consideration of viewing environments according to an exemplary embodiment of the present invention.

Consequently, since an RGB image input into the image display device is converted into an R'G'B' image through several operations, a plurality of RGB-R'G'B' LUTs can be created, so that color conversion can be performed by selecting a specific RGB-R'G'B' LUT of the created RGB-R'G'B' LUTs according to each viewing environment. Such a procedure is illustrated in FIG. 8. FIG. 8 is a view schematically illustrating a conception of color conversion using LUTs taking into account the viewing environments according to an exemplary embodiment of the present invention. That is, after a plurality of RGB-R'G'B' LUTs are created according to viewing environments, including the brightness of an illuminator and a peripheral chromaticity, one of the RGB-R'G'B' LUTs can be selected and used when a soft-proofed image is displayed.

Figure 9:
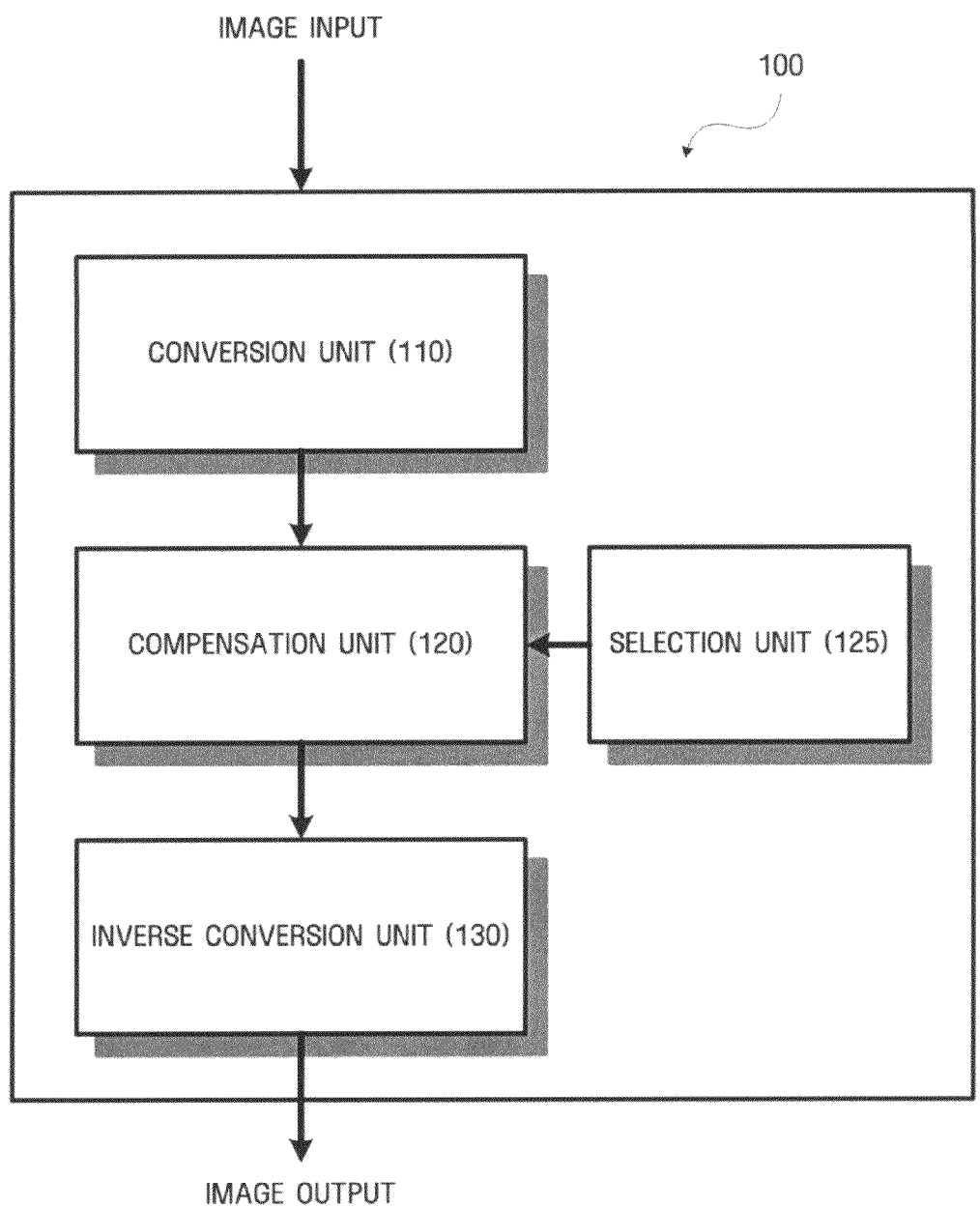
FIG. 9 is a block diagram illustrating the entire construction of an image reproduction apparatus using output prediction according to an exemplary embodiment of the present invention.

Meanwhile, FIG. 9 is a block diagram illustrating the entire construction of an image reproduction apparatus using output prediction according to an embodiment of the present invention. Referring to FIG. 9, the image reproduction apparatus 100 using the output prediction includes a conversion unit 110, a compensation unit 120, a selection unit 125, and an inverse conversion unit 130.

The conversion unit 110 converts color information of a first color space, which has been input into an image display device, into color information of a second color space, in accordance with a viewing environment previously sampled for an output image of a printing device.

The selection unit 125 functions to select a specific color distortion region which exists in the converted second color space, and the compensation unit 120 functions to compensate the selected specific color distortion region according to each color component. Herein, the color component may include luminance, saturation, and hue components.

The inverse conversion unit 130 functions to convert corrected color information of the second color space, which has been created by the compensation unit 120, into corrected color information of the first color space, in consideration of a viewing environment for the output image of the printing device, so as to display the corrected color information of the first color space through the image display device.

Herein, in an exemplary embodiment, the color information of the first color space is color information of the RGB color space, the color information of the second color space is color information of the Jab color space, the corrected color information of the first color space is color information of the R'G'B' color space, and the corrected color information of the second color space is color information of the J'a'b' color space. In addition, the viewing environments represent viewing environments based on the brightness of an illuminator, and may include viewing environments under the sunlight, under a glow lamp, and under a fluorescent lamp.

In more detail of the conversion unit 110, the conversion unit 110 converts color information of the RGB color space, which has been input into the image display device, into color information of the Jab color space through color information of the L*a*b* color space, color information of the CMYK color space, and color information of the CIE_XYZ color space. In this case, the color information of the CIE_XYZ color space is converted into the color information of the Jab color space by using the CIECAM02 forward model.

In more detail of the compensation unit 120, the compensation unit 120 compensates the hue of the soft-proofed image by establishing a range of hue shift for the specific color distortion region, compensates the saturation of the soft-proofed image by establishing a compression ratio for saturation compensation of the specific color distortion region, and compensates the luminance of the soft-proofed image by correcting the black and white values of the specific color distortion region.

In more detail of the inverse conversion unit 130, the inverse conversion unit 130 converts the color information of the J'a'b' color space into color information of the R'G'B' color space through color information of the CIE_X'Y'Z' color space, which is corrected color information of the CIE_XYZ color space. In this case, the color information of the CIE_X'Y'Z' color space can be converted into the color information of the R'G'B' color space by using the CIECAM02 reverse model.

Meanwhile, the term 'unit', as used for the components shown in FIG. 9 according to an embodiment of the present invention, means, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided by the components and units may be combined into fewer components and units or further separated into additional components and units. Moreover, the components may also be so implemented as to execute one or more CPUs.

The embodiments of the present invention can be applied to hardcopy output devices, such as a color laser printer, a photo printer, an inkjet printer, and a color multifunction printer (MFP), which acquire and output an input image of a wide color gamut, can be applied to softcopy output devices, such as a PDP, an LCD, and a mobile display device, and can be applied to devices for storing or outputting an image such as an image processing software.

In addition, it is apparent to those skilled in the art that the scope of the inventive apparatus of the present invention reaches a recording medium readable by a computer in which a program code for executing the inventive method is recorded.

According to the present invention as described above, an error in prediction for the output image of a printing device, which may be caused by an LUT measurement error or by the property of a toner, is minimized through compensation of a color distortion region, so that an image display device can predict in advance an image similar to an actual output object from a printing device, as viewed in an actual viewing environment.

It should be noted that effects of the present invention are not limited to those previously mentioned, and other effects not mentioned herein will be apparent to those skilled in the art from the following claims.

Although the exemplary embodiments of the present invention have been described for illustrative purposes, those skilled in the art will appreciate that various modifications, additions and substitutions are possible, without departing from the scope and spirit of the invention as disclosed in the accompanying claims. Therefore, it should be appreciated that the embodiments described above are not limitative, but only illustrative. Accordingly, the scope of the invention is not to be limited by the above embodiments but by the claims and the equivalents thereof.

What is claimed is:

1. A method of reproducing an image using output prediction, comprising:
   converting color information of a first color space input to an image display device into color information of a second color space, in accordance with a sampled viewing environment of an output object of a printing device;
   selecting a specific color distortion region according to a difference between an actual viewing environment and the sampled viewing environment of the second color space, and compensating a color component of the selected specific color distortion region to generate corrected color information of the second color space; and
   converting the corrected color information of the second color space into corrected color information of the first color space, and outputting the corrected color information of the first color space through the image display device;
   wherein the specific color distortion region is selected through a visual matching process, in which a soft-proofed image predicted by the image display device is visually compared with the image of the output object of the printing device;
   wherein the color information of the first color space comprises color information of an RGB color space, and the color information of the second color space comprises color information of a Jab color space; and
   wherein the color distortion region is compensated according to each color component, and the color component comprises at least one of a luminance component, a saturation component, and a hue component.

2. The method of claim 1, wherein the sampled viewing environment represents a viewing environment having an illuminator, the viewing environment having an illuminator comprising one of sunlight, a glow lamp, and a fluorescent lamp.

3. The method of claim 1, wherein the converting color information comprises converting the color information of the RGB color space, which has been input to the image display device, into color information of the Jab color space, through color information of an L*a*b* color space, color information of a CMYK color space, color information of a CIE_XYZ color space, and a CIECAM02 forward model.

4. The method of claim 1, wherein, in the visual matching process, the image of the output object and the soft-proofed image are respectively classified into predetermined regions and are compared based on a color component of the predetermined regions in comparisons, results of the comparisons are estimated as numerical values for the color component of the predetermined regions, and the specific color distortion region is selected based on sums of the numerical values.

5. The method of claim 1, wherein in the compensating the color component, the hue component is compensated by establishing a range of hue shift for the specific color distortion region in the soft-proofed image if the color component to be compensated is the hue component, the saturation component is compensated by establishing a compression ratio for saturation compensation of the specific color distortion region in the soft-proofed image if the color component to be compensated is the saturation component, and the luminance component is compensated by correcting black and white values of the specific color distortion region in the soft-proofed image if the color component to be compensated is the luminance component.

6. The method of claim 1, wherein converting the corrected color information involves correcting color information of the Jab color space into corrected color information of the RGB color space through corrected color information of a CIE_XYZ color space.

7. The method of claim 6, wherein the corrected color information of the CIE_XYZ color space is converted into the corrected color information of the RGB color space by using a CIECAM02 reverse model.

8. An apparatus for reproducing an image using output prediction, comprising:
   a conversion unit converting color information of a first color space input to an image display device into color information of a second color space, in accordance with a sampled viewing environment of an output object of a printing device;
   a selection unit selecting a specific color distortion region according to a difference between an actual viewing environment and the sampled viewing environment of the second color space;
   a compensation unit compensating a color component of the selected specific color distortion region to generate corrected color information; and
   an inverse conversion unit converting the corrected color information of the second color space into corrected color information of the first color space;
   wherein the specific color distortion region is selected through a visual matching process, in which a soft-proofed image predicted by the image display device is visually compared with the image of the output object of the printing device;
   wherein the color information of the first color space comprises color information of an RGB color space, and the color information of the second color space comprises color information of a Jab color space; and
   wherein the color distortion region is compensated according to each color component, and the color component comprises at least one of a luminance component, a saturation component, and a hue component.

9. The apparatus of claim 8, wherein the viewing environment represents a viewing environment having an illuminator, the viewing environment having an illuminator comprising one of sunlight, a glow lamp, and a fluorescent lamp.

10. The apparatus of claim 8, wherein the conversion unit converts the color information of the RGB color space, which has been input to the image display device, into the color information of the Jab color space, through color information of an L*a*b* color space, color information of a CMYK color space, color information of a CIE_XYZ color space, and a CIECAM02 forward model.

11. The apparatus of claim 8, wherein, in the visual matching process, the image of the output object and the soft-proofed image are respectively classified into predetermined regions and are compared based on a color component of the predetermined regions in comparisons, results of the comparisons are estimated as numerical values for the color component of the predetermined regions, and the specific color distortion region is selected based on sums of the numerical values.

12. The apparatus of claim 8, wherein the compensation unit compensates the hue component by establishing a range of hue shift for the specific color distortion region in the soft-proofed image if the color component to be compensated is the hue component, compensates the saturation component by establishing a compression ratio for saturation compensation of the specific color distortion region in the soft-proofed image if the color component to be compensated is the saturation component, and compensates the luminance component by correcting black and white values of the specific color distortion region in the soft-proofed image if the color component to be compensated is the luminance component.

13. The apparatus of claim 8, wherein the inverse conversion unit converts corrected color information of the Jab color space into corrected color information of the RGB color space through corrected color information of a CIE_XYZ color space.

14. The apparatus of claim 13, wherein the corrected color information of the CIE_XYZ color space is converted into the corrected color information of the RGB color space by using a CIECAM02 reverse model.

15. A non-transitory computer-readable medium having stored therein a program code for executing a method comprising:
   converting color information of a first color space input to an image display device into color information of a second color space, in accordance with a sampled viewing environment of an output object of a printing device;
   selecting a specific color distortion region according to a difference between an actual viewing environment and the sampled viewing environment of the second color space, and compensating a color component of the selected specific color distortion region to generate corrected color information of the second color space; and
   converting the corrected color information of the second color space into corrected color information of the first color space, and outputting the corrected color information of the first color space through the image display device;
   wherein the color information of the first color space comprises color information of an RGB color space, and the color information of the second color space comprises color information of a Jab color space; and
   wherein the color distortion region is compensated according to each color component, and the color component comprises at least one of a luminance component, a saturation component, and a hue component.

* * * * *